(12) United States Patent
Ikelle

(10) Patent No.: US 7,453,765 B2
(45) Date of Patent: Nov. 18, 2008

(54) SCATTERING DIAGRAMS IN SEISMIC IMAGING

(76) Inventor: Luc T. Ikelle, 6203 Queenslock Cir., Bryan, TX (US) 77802

( * ) Notice: Subject to any disclaimer, the term of this patent is extended or adjusted under 35 U.S.C. 154(b) by 0 days.

(21) Appl. No.: 11/672,318

(22) Filed: Feb. 7, 2007

(65) Prior Publication Data
US 2008/0162051 A1    Jul. 3, 2008

Related U.S. Application Data

(60) Provisional application No. 60/747,376, filed on May 16, 2006, provisional application No. 60/747,921, filed on May 22, 2006.

(51) Int. Cl.
*G01V 1/30*    (2006.01)
(52) U.S. Cl. .............................. 367/38; 367/24; 367/73; 702/14; 702/16
(58) Field of Classification Search .................. 367/24, 367/52, 38, 72, 73; 702/18, 16, 14
See application file for complete search history.

(56) References Cited

U.S. PATENT DOCUMENTS

| | | | |
|---|---|---|---|
| 4,682,307 A | 7/1987 | Newman | |
| 4,760,563 A | 7/1988 | Beylkin | |
| 4,766,574 A | 8/1988 | Whitmore, Jr. et al. | |
| 5,051,960 A | 9/1991 | Levin | |
| 5,629,905 A * | 5/1997 | Lau .............................. | 367/54 |
| 5,812,493 A | 9/1998 | Robein et al. | |
| 5,986,973 A | 11/1999 | Jericevic et al. | |
| 5,987,389 A | 11/1999 | Ikelle et al. | |
| 5,995,905 A * | 11/1999 | Ikelle et al. .................... | 702/16 |
| 6,094,400 A * | 7/2000 | Ikelle .......................... | 367/75 |
| 6,094,620 A | 7/2000 | Gasparotto et al. | |
| 6,101,448 A * | 8/2000 | Ikelle et al. ................... | 702/17 |
| 6,327,537 B1 * | 12/2001 | Ikelle .......................... | 702/14 |
| 6,507,787 B1 * | 1/2003 | Filpo Ferreira Da Silva et al. ................. | 702/1 |
| 6,678,207 B2 * | 1/2004 | Duren .......................... | 367/24 |
| 6,745,129 B1 * | 6/2004 | Li et al. ........................ | 702/17 |
| 6,763,304 B2 | 7/2004 | Schonewille | |
| 6,832,161 B1 * | 12/2004 | Moore .......................... | 702/17 |
| 2002/0118602 A1 | 8/2002 | Sen et al. | |
| 2004/0059517 A1 * | 3/2004 | Szajnowski .................. | 702/18 |

(Continued)

FOREIGN PATENT DOCUMENTS

EP    0541265    5/1993

(Continued)

OTHER PUBLICATIONS

Chesnokov et al. Behavior of Elastic Characteristics of Random Layered Media. 9th International Workshop on Seismic Anisotropy. Houston, TX. Mar. 26-31, 2000.*

(Continued)

*Primary Examiner*—Ian J Lobo
(74) *Attorney, Agent, or Firm*—Oppedahl Patent Law Firm LLC

(57) ABSTRACT

The analysis of scattering diagrams of the correlation-type representation theorem in inhomogeneous media is improved by the use of virtual events. Virtual events here are events which are not directly recorded in standard seismic data acquisition, but the assumption of their existence permits the construction, of internal multiples with scattering points at the sea surface.

18 Claims, 10 Drawing Sheets

U.S. PATENT DOCUMENTS

| | | | |
|---|---|---|---|
| 2004/0196738 A1 | 10/2004 | Tal-Ezer | |
| 2005/0117451 A1 | 6/2005 | Robertsson | |
| 2005/0180262 A1 | 8/2005 | Robinson | |
| 2005/0286344 A1* | 12/2005 | Li et al. | 367/52 |
| 2008/0106974 A1* | 5/2008 | Bergery | 367/38 |

FOREIGN PATENT DOCUMENTS

| | | |
|---|---|---|
| GB | 2090407 | 7/1982 |
| GB | 2312281 A * | 10/1997 |

OTHER PUBLICATIONS

Ikelle, Lic T, "A construct of internal multiples from surface data only: the concept of virtual seismic events", Geophys. J. Int. Feb. 2006, vol. 164, pp. 383-393.

Ikelle Luc T & Amundsen Lasse, "AVO-A response of an anisotropic half-space bounded by a dipping surface for P-P, P-SV and P-SH data", Journal of Applied Geophysics, 2001, vol. 46, pp. 1-29.

International Search Report from PCT/US2007/069077, listing the five references herein as "A" references.

Written Opinion from PCT/US2007/069077, finding all nine pending claims to be novel and to possess inventive step.

Amundsen, L., 2001, Elimination of free-surface related multiples without need of the source wavelet: Geophysics, 66, 327-341.

Amundsen, L., L.T. Ikelle, and L.E. Berg, 2001, Multidimensional signature deconvolution and free-surface multiple elimination of 4C data: Geophysics, 66, 1594-1604.

Berkhout, A.J., and D.J. Verschuur, 2005, Removal of internal multiples with the common-focus-point (CFP) approach: Part1—Explanation of the theory: Geophysics, 70, V45-V60.

Bojarski, N., 1983, Generalized reaction principles and reciprocity theorems for the wave equation, and the relationship between the time-advanced and time-retarded fields: J. Acoust. Soc. Am., 74(1), 281-285.

Derode A., E. Larose, M. Campilllo, and M. Fink, 2003, How to estimate the Green's function of a heterogeneous medium between two passive sensors? Application to acoustic waves: Applied Physics Letters, 83, 3054-3056.

de Hoop, A.T., 1966, An elastodynamic reciprocity theorem for linear, viscoelastic media: Appl. Sci. Res., 16, 39-45.

de Hoop, A.T., 1995, Handbook of radiation and scattering of waves: Academic Press, San Diego, CA.

Fokkema, J.T., and van den Berg, P.M., 1990, Removal of surface-related wave phenomena: the marine case: 60th Ann. Internat. Mtg., Soc. Expl. Geophys., Expanded Abstracts, 1689-1692.

Fokkema, J.T., and van den Berg, P.M., 1993, Seismic applications of acoustic reciprocity: Elsevier Science Publ.

Gangi, A.F., 1970, A derivation of the seismic representation theorem using seismic reciprocity: J. Geophys. Res., 75, 2088-2095.

Ikelle, L.T., Roberts, G., and Weglein, A.B., 1997, Source signature estimation based on the removal of first-order multiples: Geophysics, 62, 1904-1920.

Ikelle, L.T., Amundsen, L., Gangi, A., and Wyatt, S., 2003, Kirchoff scattering series: Insight into the multiple attenuation method: Geophysics, 68, 16-28.

Ikelle, L.T., and Amundsen, L., 2005, An Introduction to petroleum seismology: Investigations in Geophysics, Society of Exploration Geophysics, Tulsa.

Kennett, B.L.N., 1979, The suppression of surface multiples on seismic records: Geophysical Prospecting, 27, 584-600.

Rickett, J., and J. Claerbout, 1999, Acoustic daylight via spectral factorization: Helioseismology and reservoir monitoring: The Leading Edge, 18, 957-960.

Roux, P., and M. Fink, 2003, Green's function estimation using secondary sources in a shallow water environment: J. Acoust. Soc. Am., 113 (3), 1406-1416.

Schuster, G.T., J. Yu, J. Sheng, and J. Rickett, 2004, Interferometric/ daylight seismic imaging: Geophysical Journal International, 157, 838-852.

Stolt, R.H., 1978, Migration by Fourier transform: Geophysics, 43, 23-48.

Verschuur, D.J., and A.J. Berkhout, 2005, Removal of internal multiples with the common-focus-point (CFP) approach: Part2—Application strategies and data examples: Geophysics, 70, V61-V72.

Veselago, V.G., 1968, The electrodynamics of substances with simultaneously negative values of $\epsilon$ and $\mu$: Soviet Physics Uspekhi, 10, 509-514.

van Manen, D.J., J. O. A. Robertsson, and A. Curtis, 2005, Modeling of Wave Propagation in Inhmogeneous Media: Physical Review Letters, 94, 164301.

Wapenaar, K., 2004, Retrieving the elastodynamic Green's function of an arbitrary inhomogeneous medium by crosscorrelation: Physical Review Letter, 93, 254301.

Ziolkowski, A.M., D.B. Taylor, and R.G.K. Johnston, 1999, Marine seismic wavefield measurement to remove sea-surface multiples: Geophysical Prospecting, 47, 841-870.

* cited by examiner

ITERATION 1

Step #1

Step #2

ITERATION 2

Step #1

Step #2

SCATTERING DIAGRAMS IN SEISMIC IMAGING

CROSS-REFERENCE TO RELATED APPLICATIONS

This application claims the benefit of U.S. application No. 60/747,376 filed May 16, 2006, and U.S. application No. 60/747,921, filed May 22, 2006, each of which is hereby incorporated by reference for all purposes.

BACKGROUND

It is not easy to analyze seismic data. Ghosts, free-surface multiples, and internal multiples can all get in the way of finding the desired information such as the location, thicknesses, and velocities of propagation associated with layers of interest.

SUMMARY OF THE INVENTION

I here disclose a new type of scattering events that we discovered while analyzing the scattering diagrams of the correlation-type representation theorem in inhomogeneous media. I also link these new scattering events with the notion of negative refraction in optics and that of virtual particles in quantum field theory. Just like the Feynmann diagrams in quantum field theory, the scattering diagrams used in our analysis in this short note are a schematic form for the wave propagation that allows us to understand and develop the wave-scattering theory and its applications in simple and natural terms rather than only in an abstract mathematical way.

I have called the new set of scattering "virtual-reflection" events. Again, virtual events here are events which are not directly recorded in standard seismic data acquisition, but their existence allows us to construct, for instance, internal multiples with scattering points at the sea surface; the standard construct of internal multiples does not include any scattering points at the sea surface.

I also disclose here four applications of the virtual events: (i) attenuation of internal multiples, (ii) an integration of velocity estimation and migration (i.e., automated imaging: version 1), (iii) an integration of multiples attenuation, velocity analysis, and migration (i.e., automated imaging: version 2) and (iv) an integration of multiples attenuation, P/S decomposition, velocity analysis, and migration (i.e., automated imaging: version 3).

In imaging applications, I here describe imaging methods in which the interval velocity estimation and depth migration are performed simultaneously. The methods work in a way similar to velocity-migration methods; that is, we perform several constant-velocity migrations (e.g., Stolt, 1978) and select the migration result and the corresponding velocity that produce the best-focused image of the subsurface. However, there are two key differences between our imaging method and classical velocity-migration methods. One of these differences is that our imaging produces the thicknesses of the layers of the subsurface, and the actual velocities associated with these layers, instead of estimating root-mean-square velocities and locating the subsurface reflectors. We then use the fact that we can accurately image the first reflector in the subsurface (i.e., the sea floor in the marine case) to construct from the thicknesses a depth image and an interval velocity model of the subsurface. The other key difference between our imaging method and classical velocity-migration methods is that we operate on the new scattering events introduced recently, known as virtual events instead of the actual data themselves.

DESCRIPTION OF THE DRAWING

FIG. 6: An illustration of how we can progressively move the bottom internal-multiple generator (BIMG) to generate and attenuate several classes of internal multiples. This process is carried out iteratively. In the first iteration, we predict and attenuate all the internal multiples which have at least one bounce above the BIMG1 and at least one below the BIMG1. Using the output of this iteration as our new data, we then move the BIMG deeper to a new position: the BIMG2. We partition our new data in $P_{02}$ and $P'_{02}$. Notice that $P_{02}$ does not include data above the BIMG1. Then we predict and attenuate all the internal multiples which have at least one bounce located between the BIMG1 and the BIMG2, one bounce below the BIMG2, and so on.

FIGS. 7a and 7b: An illustration with scattering diagrams of the first two iterations of the iterative process described in FIG. 6. The first iteration (FIG. 7a) predicts and attenuates all the internal multiples which have at least one bounce above the BIMG1 and at least one below the BIMG1. The output of this iteration is used as the data for the second iteration. So in the second iteration (FIG. 7b), we predict and attenuate all the internal multiples which have at least one bounce located between the BIMG1 and the BIMG2, one bounce below the BIMG2, and so on.

DETAILED DESCRIPTION

Figure 1:
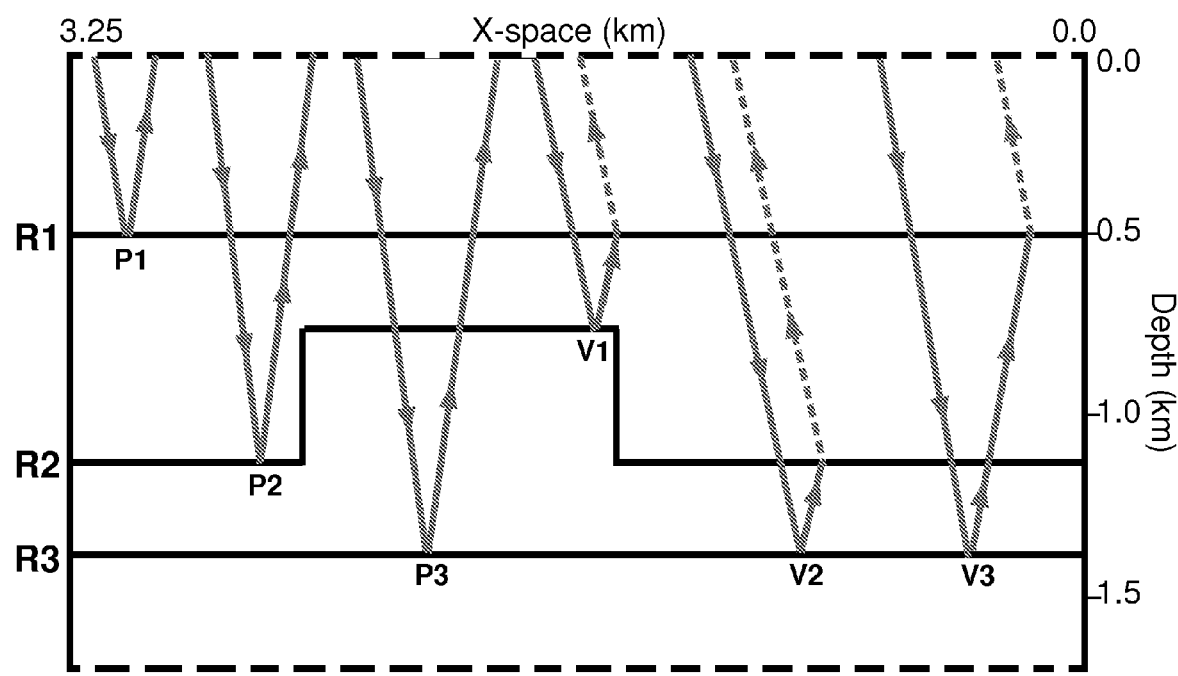
FIG. 1: An example of geological models used in our imaging. We have superimposed on this model three virtual events (V1, V2, and V3) in addition to the three primaries (P1, P2, and P3) associated with this model.

FIG. 1 shows examples of virtual events in addition to the three primaries superimposed on a geological model. The key feature of virtual events that we are primarily concerned with in this invention is the fact that they carry the information about the thicknesses of layers but not their locations. This feature of virtual events stems from the crosscorrelation operation invoked in the construction of these events. In fact, the field of virtual events contains only information about the relative time delays between the real events but not their actual arrivals. After recovering the various thicknesses of layers associated with a given model of the subsurface, we then construct a depth model using the first reflector in the subsurface as the reference surface. Note that this method requires long offset data, about one to two kilometers more that standard data, to compensate for the reduction of the data aperture that occurs during the construction of virtual events.

Putting Scattering Diagrams to Work

Figure 2:
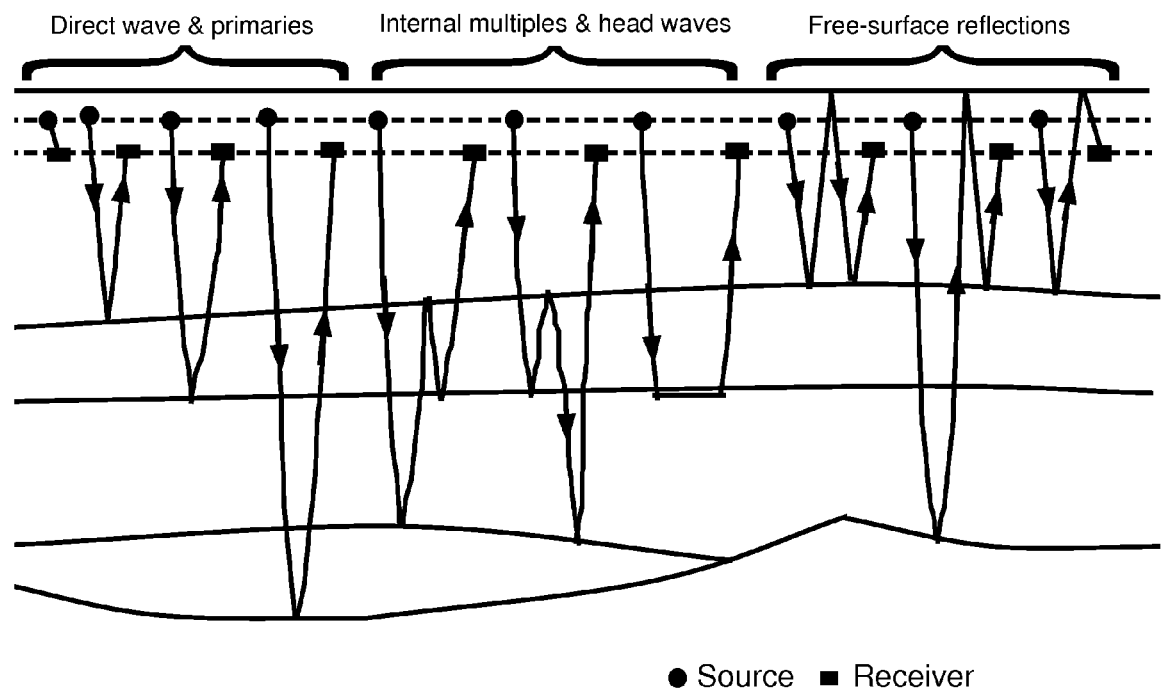
FIG. 2: Examples of the scattering diagrams for direct wave, primaries, free-surface reflections, and internal multiples.

Examples of the wave-propagation paths which constitute towed-streamer data are depicted in FIG. 2. These events can be grouped into three categories: primaries, free-surface-reflection events (ghosts and free-surface multiples), and internal multiples. Primaries are seismic events which reflect or diffract only once in the subsurface, but not at the free surface, before being recorded. Free-surface-reflection events (ghosts and free-surface multiples) are events with at least one reflection at the sea surface in their wave-propagation path. When the first and/or last reflection in the wave-propagation path of a free-surface-reflection event is at the sea surface, the free-surface-reflection event is characterized as ghosts. All the other free-surface-reflection events are characterized as free-surface multiples. Internal multiples are seismic events with no reflection at the free surface but with reflections between two interfaces other than the free surface. Two types of events in seismic data do not readily fall into the three categories that we have defined. Those events are head waves and direct waves. We treat head waves here as internal multiples and direct waves as primaries.

The key processes of marine seismic imaging (which are at the heart of modern oil and gas exploration and production) include (i) removing free-surface-reflection events from the data and leaving primaries and internal multiples, (ii) removing internal multiples from the data and leaving primaries, and then (iii) locating the scattering points and reflectors in the subsurface, which are the sources of primaries and internal multiples in particular. The key of our discovery is that all these processes can be explained, derived, and "optimized" using scattering diagrams (diagrammatica) in a way similar to the way the quantum field theory is often explained using Feynman diagrams. Our description of the optimization of seismic processes will become clearer in the next paragraph. Note that diagrammatica here mean a collection of scattering diagrams used to describe seismic events. We obviously expect this collection to grow significantly in the coming years in such a way that will enable us to describe the entire field of petroleum seismology through scattering diagrams.

Before we describe the convention used in drawing our scattering diagrams, let us recall that solutions of wave equations (wave equations are the building blocks of seismology) involve waves traveling in positive as well negative time, the so-called "retarded" and "advanced" waves. Retarded waves progressively move with increasing time, as visualized in the classical movies of wave propagation (e.g., Ikelle and Amundsen, 2005). They are consistent with the way the current seismic data acquisitions are carried out; they arrive at receiver locations at some time after they have left the source location. Advanced waves travel backward in time; that is, they arrive at the hydrophones or geophones before they have left the source point. These waves are really an affront to our common sense and our understanding of how the world operates—our ever-aging bodies being an obvious testimony. So despite the fact that advanced waves are valid solutions to the wave equations, they are generally ignored in most seismology studies, at least in part, because of their counterintuitive nature. One of the key features of our diagrammatica here is that these advanced waves are included in our constructions of the scattering diagrams of seismic events.

Figure 3:
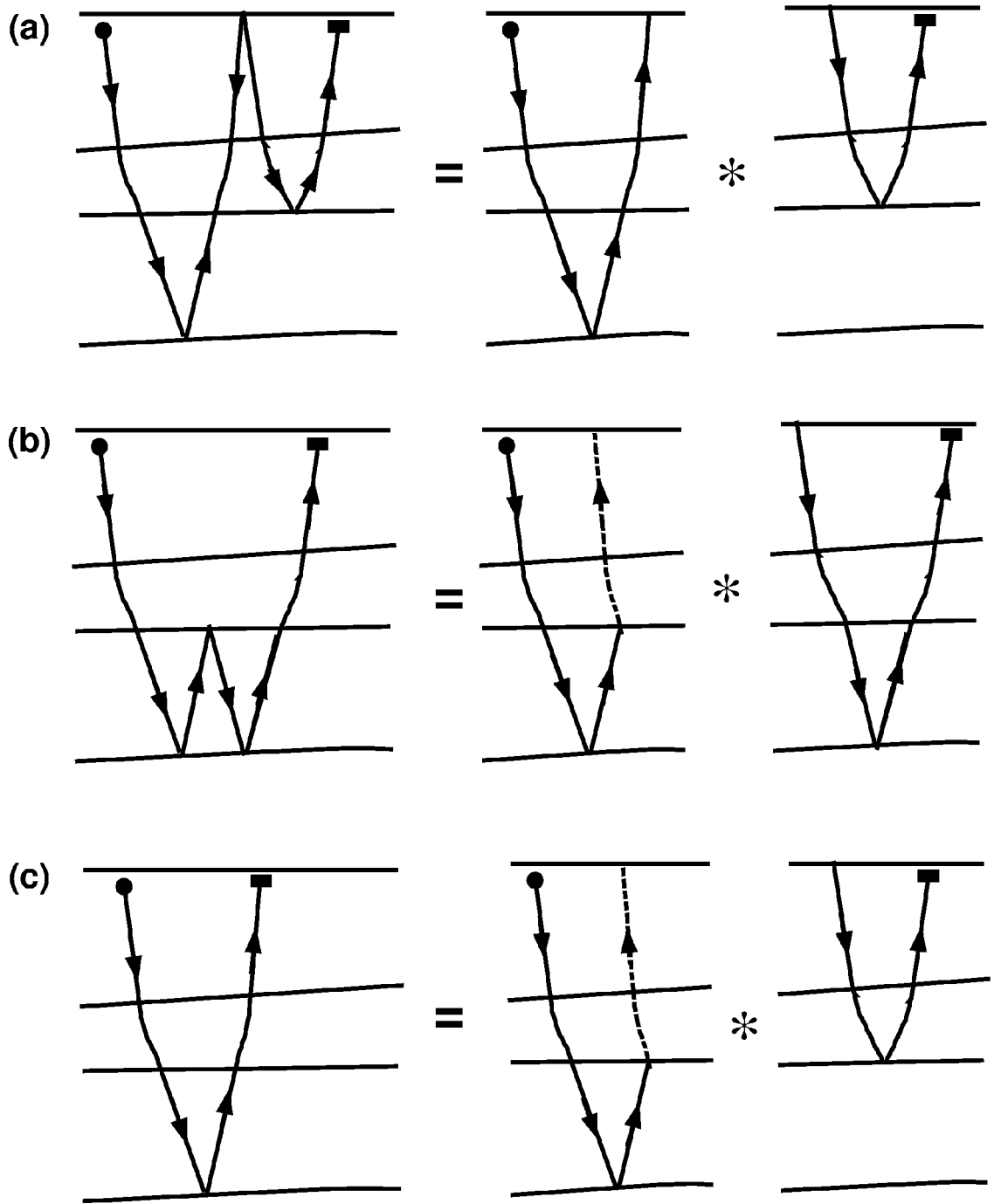
FIG. 3: Examples of constructions of primaries, free-surface multiples, and internal multiples using scattering diagrams. In these scattering diagrams, like the ones in the remaining figures in this invention, the process of wave propagation begins on the left and ends on the right. The solid line represents waves traveling forward in time, and the dotted line represents waves traveling backward in time. (a) A combination of two primaries is used to predict a first-order multiple. Notice that it is always possible to construct free-surface-reflection events by combining the wave-propagation paths of two real events contained in the same seismic data because the wave-propagation paths of free-surface-reflection events contain at least one reflection point at the sea surface. (b) A combination of a primary with a virtual event can produce an internal multiple. (c) This combination can also produce primaries. Notice that the virtual event allows us to compensate for the fact that internal multiples and primaries do not contain free-surface reflection points.

In our scattering diagrams, such as the ones in FIG. 3, the process of wave propagation begins on the left and ends on the right. The solid line represents waves traveling forward in time (forward wave propagation), and the dotted line represents waves traveling backward in time (backward wave propagation). In forward wave propagation, the process begins on the left and ends on the right, whereas in backward wave propagation, it is the opposite. The arrows are added in these scattering diagrams to clearly indicate the direction of wave propagation. The point at which two lines meet is known as the scattering point. Scattering points can occur at the intersection of two solid lines, of two dotted lines, or of a solid line and a dotted line. The time is not explicitly shown in the scattering diagrams of this patent in order to avoid an unnecessary complication associated with a third axis. Notice that all events recorded in seismic data (i.e., direct waves, primaries, ghosts, and multiples) have a forward propagation. Therefore, in our diagrammatica, these events will be entirely marked by solid lines and will go from left to right. We will call them "real events." Their noncausal versions, which correspond to backward propagation, will be marked by dotted lines and will go from right to left. We will call them "anti-causal events." There are events which combine solid and dotted lines in their constructs. Such events will appear only in intermediate, unobservable stages of a process for constructing a real event. We will call these event "virtual events."

As we can see in FIG. 3, it is always possible to construct free-surface-reflection events by combining wave-propagation paths of events contained in the same seismic data because the wave-propagation paths of free-surface-reflection events contain at least one reflection point at the sea surface. That is not the case for internal multiples and primaries. For example, to compensate for the fact that internal multiples do not contain free-surface-reflection points in their wave-propagation paths, the technology commonly used today in the oil and gas industry for constructing internal multiples, developed by Berkhout and Veschuur (1997), requires that the internal-multiple-generating reflectors be known, say, through interpretation of data. For the same reason, current migration methods used for locating the scattering points and reflectors in the subsurface from the field of primaries also require knowledge of a smooth-background-velocity model. This smooth-velocity model is used to extrapolate data acquired near the sea surface to the scattering points inside the subsurface, where there is no receiver.

Figure 4:
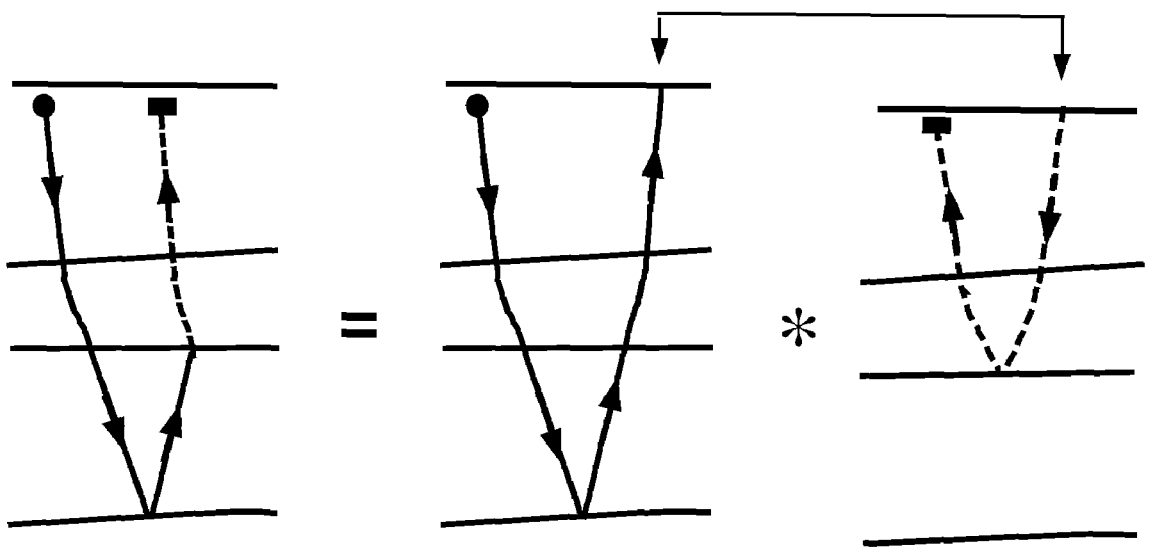
FIG. 4: An illustration of the construction of virtual seismic data as a combination of two primaries in which one of the primaries has been time-inverted.

So in addition to removing multiples from the data and leaving only primaries, modern seismic imaging methods also require the estimation of a smooth-velocity model of the subsurface before applying migration algorithms to seismic data. By using the concept of virtual events, we here found that internal multiples and primaries can be constructed with the scattering point at the sea surface, just like free-surface multiples, as depicted in FIGS. 3 and 4. Furthermore, this concept can be used to remove internal multiples from the data and to develop methods for locating the scattering points and reflectors in the subsurface in which velocity estimation and migration are combined in a single algorithm. In other words, this concept of virtual events can be used not only to improve our understanding of the construction of internal multiples and primaries but also to develop more-optimal imaging solutions. Again, note that virtual events are not directly recorded in seismic data, but they can be constructed from seismic data by time inverting one of the two fields used in their constructions (see FIG. 4).

Let us remark that one can establish an analogy between virtual events and the concept of virtual particles in quantum field theory. Just like virtual events, virtual particles are theoretical particles that cannot be detected directly but are nonetheless a fundamental part of quantum field theory. There is also a connection between virtual events and the notion of negative refraction in optics. This notion is generally attributed to Veselago (1968), who first hypothesized that the material with a negative refractive index could exist so that light entering a material with a negative refractive index from a material with a positive refractive index will bend in the opposite direction of the usual observation. The similarities between the last two legs of the virtual events and the path of negative refraction are included in these patent.

Our discussion of these various constructs of seismic events is centered on the convolution-type and crosscorrelation-type representation theorems, as derived, for example, in Bojarski (1980), de Hoop (1995), and Gangi (1970). Other studies, especially those related to multiple attenuation and up/down wavefield separation, have used the convolution-type representation theorem as the starting point of the development of their solutions. They include Kennett (1979), Fokkema and van den Berg (1990, 1993), Ziolkowski et al. (1999), Amundsen (2001), Amundsen et al. (2001), and Ikelle et al. (2003). We have included Fokkema and van den Berg (1990, 1993) in the list, although their starting point is actually the convolution-type reciprocity theorems from which the convolution-type representation theorem can be deduced. One of the novelties here is our use of both the crosscorrelation-type and convolution-type representation theorems in our constructs of the scattering diagrams of seismic events.

Let us also note that Van Manen et al. (2005) have also recently used the crosscorrelation-type representation theorem for improving the computation time of finite-difference modeling. Derode et al. (2003), Roux and Fink (2003), and Wapenaar (2004) have explicitly or implicitly used the correlation-type reciprocity theorems to retrieve Green's function of inhomogeneous media from wavefield recordings. We also show in this patent that the intuitive results of internal multiple attenuation can be derived from the crosscorrelation-type representation theory. Although not yet established, the works of Rickett and Claerbout (1999) and of Schuster et al. (2004) on daylight imaging, and that of Berkhout and Verschuur (2005) and Verschuur and Berkhout (2005) on internal multiple attenuation, can also be related to the crosscorrelation-type representation theorem because, at the very least, they invoke time reversal and the crosscorrelation of wavefields.

The solutions to the problem of free-surface multiple attenuation are for example U.S. Pat. Ser. No. 6,763,304 B2, U.S. 2002/0118602, U.S. Pat. No. 5,051,960, U.S. Pat. No. 5,986,973, U.S. Pat. No. 5,995,905, U.S. Pat. No. 6,094,620, U.S. Pat. No. 6,507,787, EP 0 541 265 A2, U.S. Pat. No. 6,832,161 B1. A patent related to internal multiple attenuation is (GB2090407A). Examples of imaging solutions are U.S. Pat. No. 4,760,563, U.S. Pat. No. 4,766,574, and U.S. Pat. No. 2004/0196738 A1. A solution to wavefield separation into upgoing and downgoing waves is (U.S. Pat. No. 2005/0117451).

Again, the invention described here is different from previous inventions in at least three aspects:
 (i) it is based on the concept of virtual events that none of the previous inventions used;
 (ii) it combines several processing steps in one step while the current inventions focuses on one step only; and
 (iii) in our invention, the processing steps, such as up/down separation, take place at points located inside the subsurface instead of at receiver points, as in previous inventions.

Renormalization of Virtual Events

In physics, renormalization refers to a variety of theoretical concepts and computational techniques revolving either around the idea of resealing transformation, or the process of removing infinities from calculated quantities. Renormalization is used here in the context of resealing a transformation—more precisely, resealing the crosscorrelation operation.

The first question is, why do we need to renormalize virtual events? The second question is how do we mathematically describe this renormalization? Our objective in this section is to answer these two question.

The field of virtual events is generally defined as follows:

$$P_A(x_r, \omega; x_s) = -a^*(\omega) \int_{S_0} dS(x) [P_p^*(x, \omega; x_r) v_3(x, \omega | x_s)], \quad (1)$$

where $P_A$ denotes the virtual data, $P_P$ is the pressure data, and $v_3$ are the particle-velocity data.

To ensure an effective removal of predicted internal multiples from the data or higher resolution in the imaging, it is important to make the amplitude of virtual events consistent with those of the data by replacing $P_P^*$ in the computation of virtual events with $P_P^{-1}$. The field $P_P^{-1}$ is defined as follows:

$$\int_{S_0} dS(x) P_P^{-1}(x_s, \omega, x) P_p(x, \omega, x_s) = \delta(x_s - x_r) \quad (2)$$

or its equivalent, $$\int_{S_0} dS(x) A(x_s, \omega, x) P_P^{-1}(x, \omega, x_r) = P_p(x_s, \omega, x_r), \quad (3)$$

where $$A(x_s\omega, x) = \int_{S_0} dS(x') P_p^*(x_s, \omega, x') P_p(x', \omega, x). \quad (4)$$

Thus, (1) becomes $$P'_A(x_r, \omega; x_s) = \int_{S_0} dS(x) P_P^{-1}(x, \omega; x_r) v_3(x, \omega; x_s), \quad (5)$$

where $P_A'$ denotes the field of normalized virtual events. The traveltimes of normalized virtual events in $P_A'$ are unchanged compared to the traveltimes of the same events in $P_A$. They only differ in amplitudes.

The Concept of Virtual Events in the Attenuation of Internal Multiples

Figure 5A:
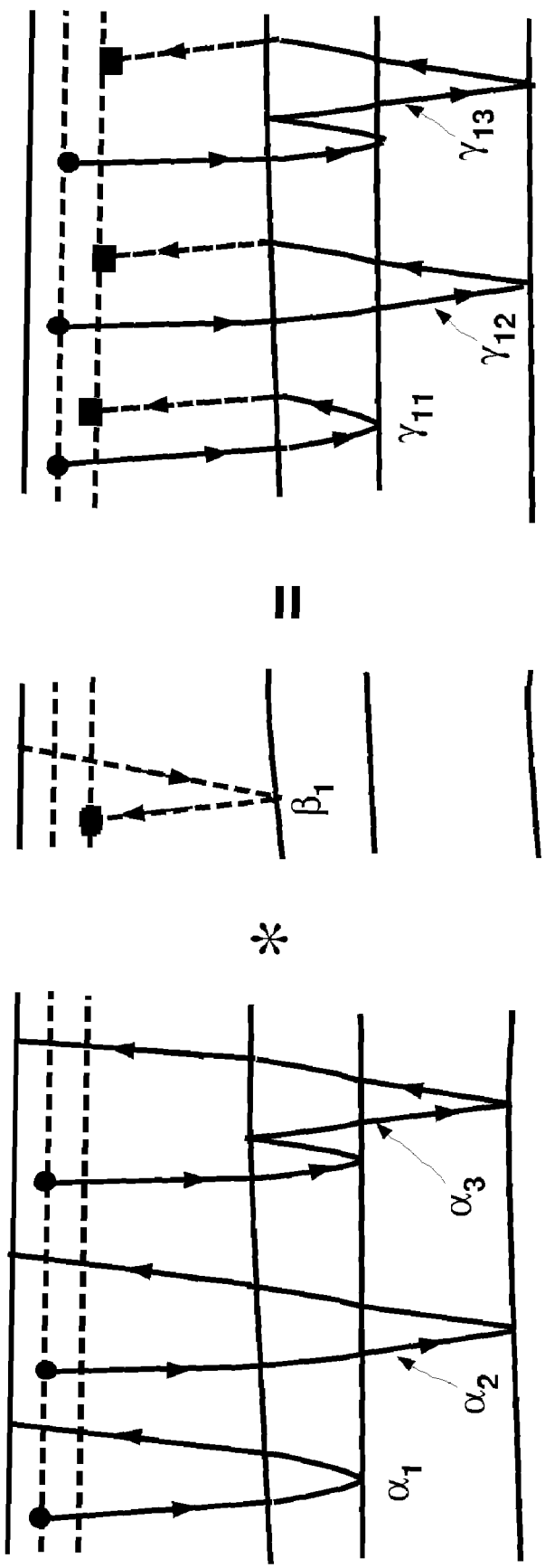
FIGS. 5a and 5b: An illustration with scattering diagrams of the two-step process for generating internal multiples. The first step (FIG. 5a) generates virtual events which are then used in step 2 (FIG. 5b) to generate internal multiples. Notice that the data in the first step are divided into parts which do not intersect. The earlier part contains only primaries, and the latter part contains primaries and internal multiples ($\gamma_{ij} = \alpha_i * \beta_j$ and $\eta_{ijk} = \alpha_i * \gamma_{jk}$.
Figure 5B:
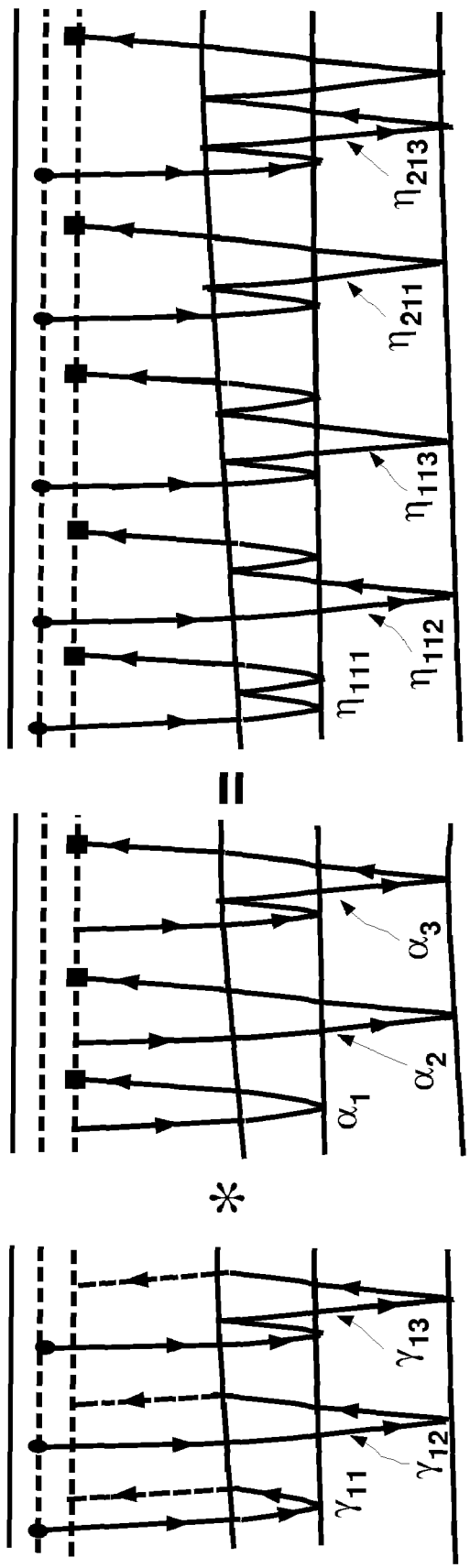

As shown in FIGS. 5a and 5b, the crosscorrelation of $P_P$ (made of event $\beta_1$) with $v_3$ (made of events $\alpha_1'$, $\alpha_2'$, and $\alpha_3'$) allows us to create only causal virtual events. Moreover, this correlation does not create the apparent direct wave. In fact, as long as the events in $P_P$ arrive earlier than the events in $v_3$, without an overlap between the fields, the crosscorrelation of the two fields will not produce direct wave events. By convolving the field of virtual events in FIG. 5a with $v_3$ (i.e., $\alpha_1'$, $\alpha_2'$), we obtained a field containing only internal multiples. Because $P_P$ was limited to one event only, we obtained only internal multiples related to this event. In other words, if event $\beta_1$ corresponds to the sea-floor reflection, we only predicted sea-floor-related internal multiples. We will describe later how this process can be carried out iteratively to predict and attenuate all internal multiples included in seismic data.

To explicitly analyze the traveltimes of internal multiples predicted in FIGS. 5a and 5b, let us use the 1D example. The vertical component of the particle velocity, $v_3$, and the pressure, $P_P$, are now defined as follows:

$$v_3 = \alpha_1' Y_1 + \alpha_2' Y_2 + \alpha_3' Y_3, \tag{6}$$

$$P_P = \beta_1 Z_1, \tag{7}$$

where $$Z_1 = \exp\{-i\omega\tau_1^{(z)}\}, Y_k = \exp\{-i\omega\tau_k^{(y)}\} \tag{8}$$

and k takes the values 1, 2, and 3. If $\tau_1$, $\tau_2$, and $\tau_3$ denote the one-way traveltimes in the first layer, second layer, and third layer, respectively, then $\tau_1^{(z)} = 2\tau_1$, $\tau_1^{(y)} = 2\tau_1 + 2\tau_2$, $\tau_2^{(y)} = 2\tau_1 + 2\tau_2 + \tau_3$, and $\tau_3^{(y)} = 2\tau_1 + 4\tau_2 + 2\tau_3$. The crosscorrelation of $v_3$ and $P_P$, which we have denoted $\gamma'_{k1}$, is given by $$\gamma_{k1}'(\omega) = \alpha_k' \beta_1 \exp\{-i\omega[\tau_k^{(y)} - \tau_1^{(z)}]\}. \tag{9}$$

In the time domain, this field is $$\gamma_{k1}'(t) = \alpha_k' \beta_1 \delta[t - \tau_k^{(y)} + \tau_1^{(z)}] = \alpha_k \beta_1 \delta[t - t_k^{(yz)}], \tag{10}$$

where $$t_k^{(yz)} = \tau_k^{(y)} - \tau_1^{(z)}. \tag{11}$$

$\gamma'_{k1}(t)$ is the Fourier transform of $\gamma'_{k1}(\omega)$. Notice that $t_k^{(yz)} > 0$, thus all the virtual events in $\gamma'_{k1}(t)$ are causal. The convolution of $\gamma'_{k1}$ with $v_3$ for predicting internal multiples, which we have denoted $\eta_{kl1}$, is given by $$\eta_{kn1}(\omega) = \alpha_k' \alpha_n' \beta_1 \exp\{-i\omega[\tau_k^{(y)} - \tau_1^{(z)} + \tau_n^{(y)}]\}. \tag{12}$$

In the domain, this field is $$\eta_{kn1}(t) = \alpha_k' \beta_1 \delta[t - \tau_k^{(y)} - \tau_n^{(y)} + \tau_1^{(z)}] = \alpha_k \beta_1 \delta[t - t_{kn}^{(yzy)}], \tag{13}$$

where $$t_{kn}^{(yzy)} = \tau_k^{(y)} + \tau_n^{(y)} - \tau_1^{(z)}. \tag{14}$$

$\eta_{kl1}(t)$ is the Fourier transform of $\eta_{kl1}(\omega)$. So the traveltimes of internal multiples, denoted $\eta_{kl1}$ in FIG. 5b, are $t_{kn}^{(yzy)}$. We can verify, for example, that the traveltime of $\eta_{11}$ is $t_{11}^{(yzy)} = 2\tau_1 + 4\tau_2$, that the traveltime of $\eta_{121}$ is $t_{11}^{(yzy)} = 2\tau_1 + 4\tau_2 + 2\tau_3$, and that the traveltime of $\eta_{311}$ is $t_{31}^{(yzy)} = 2\tau_1 + 6\tau_2 + 2\tau_3$. All these traveltimes are consistent with the scattering diagrams for the particular case in which the reflectors are assumed to be horizontal and the data are limited to zero offset.

Figure 6:
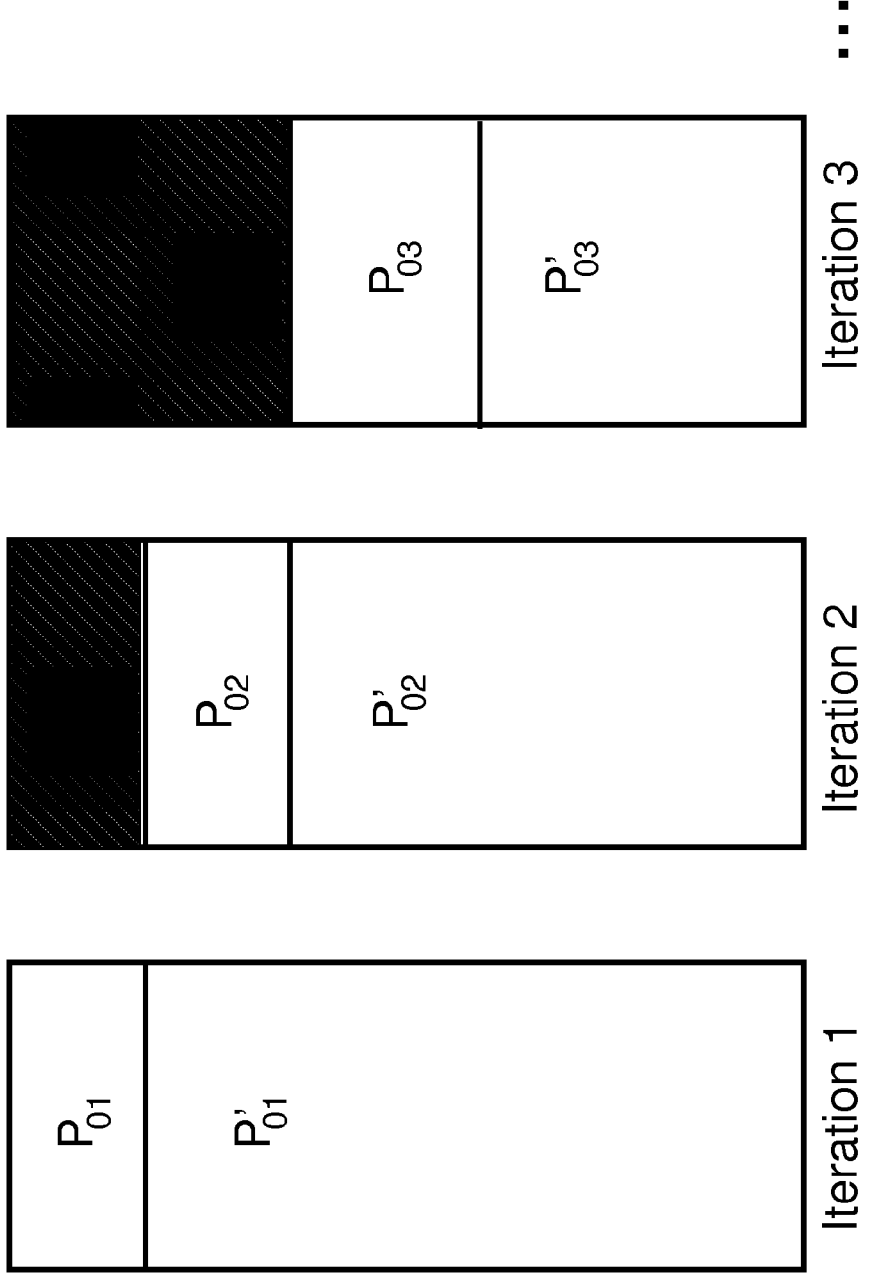
Figure 7A:
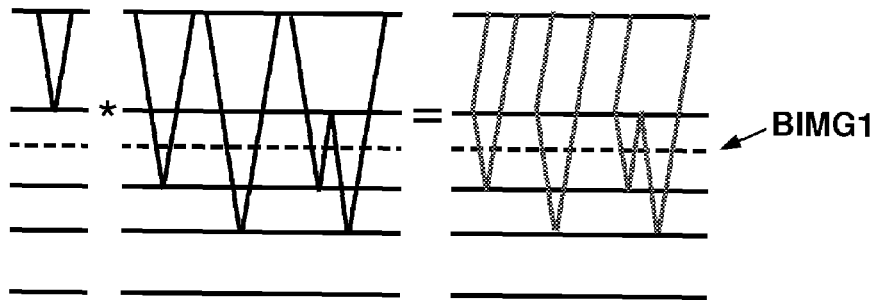
Figure 7A:
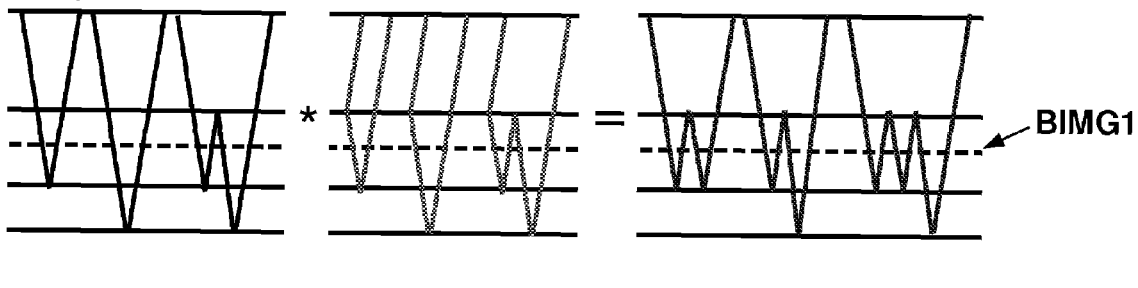
Figure 7A:
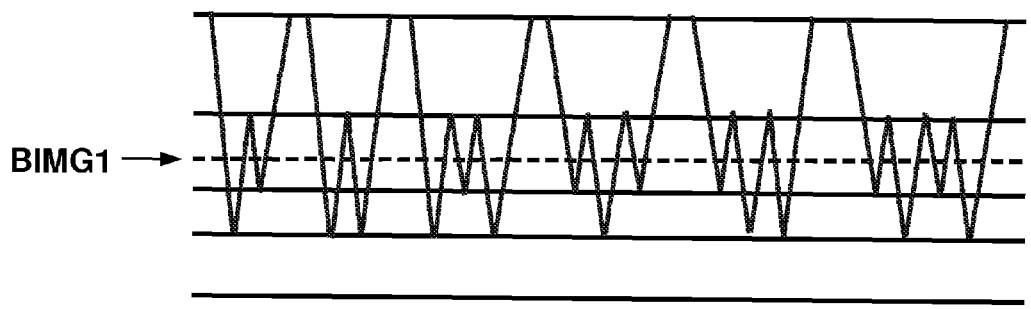
Figure 7B:
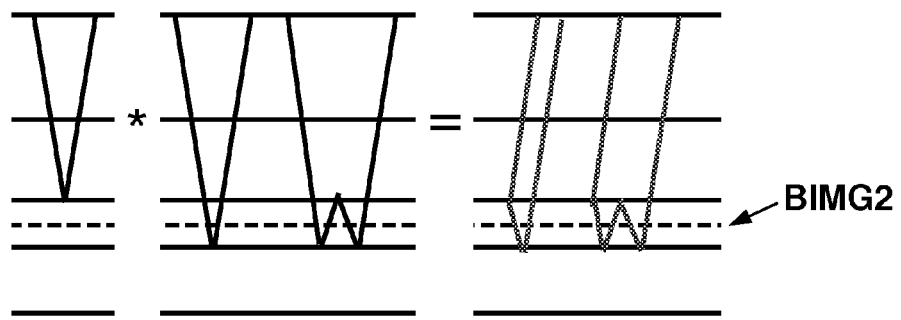
Figure 7B:
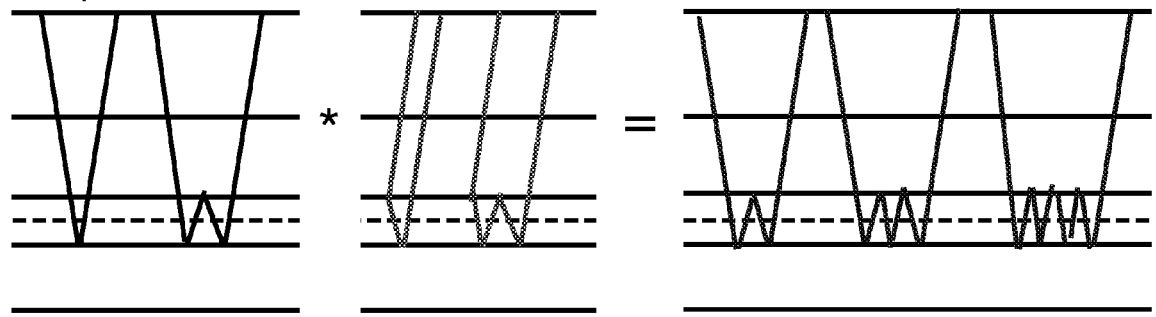

The results in FIGS. 5a and 5b are limited to the attenuation of sea-floor internal multiples. We can use the scheme in FIG. 6 to iteratively remove any other internal multiples left in the data, as FIGS. 6 and 7 show. The basic idea of the iteration process is to continuously segment the data at each iteration, as described in FIG. 6. We call the boundary at which the data are segmented the bottom internal-multiple generator (BIMG) because, for a BIMG at a given iteration, all internal multiples with at least one bounce at the BIMG, or above the BIMG, are predicted and subtracted, as described in FIG. 7. So at the first iteration, we predict and attenuate all the internal multiples which have at least one bounce above the first BIMG (which we denote BIMG1) and at least one below the BIMG1. In FIG. 7 the data above the BIMG1 are denoted $P_{P1}(x_s, \omega, x)$ and $v_{31}(x_s, \omega, x)$, and the data below the BIMG1 are denoted $P'_{P1}(x_s, \omega, x_r)$ and $v'_{31}(x_s, \omega, x)$. The output of this iteration is used as the data for the next iteration.

In the second iteration, we move the BIMG deeper, to a new position, say, the BIMG2, and define new fields $P_{P2}(x_s, \omega, x)$, $v_{32}(x_s, \omega, x)$, $P'_{P2}(x, \omega, x_r)$, and $v'_{32}(x_s, \omega, x)$, as depicted in FIG. 6. Notice that $P_{P2}(x_s, \omega, x)$i and $v_{32}(x_s, \omega, x)$ does not include data above the BIMG1. Then we predict and attenuate all the internal multiples which have at least one bounce between the BIMG1 and the BMG2, one bounce below the BIMG2, and so on.

Notice that arbitrary trajectories can be used for selecting the BIMG locations. In other words, one portion of an event may be located above the BIMG, and the other portion of the same event may be located below the BIMG. This separation is not a problem; the portion of the event located above the BIMG will be used to predict internal multiples in one iteration, and the second portion of the event located below the BIMG will be used in the next iteration to predict the second set of internal multiples associated with the event located below the BIMG. In other words, the fact that some complex events may not fall completely above the BIMG or completely below the BIMG is another reason why the iterative process described in FIGS. 6 and 7 is necessary.

The Concept of Virtual Events in Seismic Imaging

Let us now turn our attention to the problem of constructing scattering diagrams for seismic imaging—that is, locating scattering points instead of constructing seismic events. Our approach here is to image virtual events instead of primaries as is classically done in seismic processing.

By segmenting our data, we can turn the problem of depth imaging to that of imaging with constant velocities. Let us recall that imaging with constant velocities is very computation-efficient compared to depth imaging, but it generally leads erroneous model of the subsurface just like time imaging. The reason for this is that the constant-velocity imaging ignores the Fermat principle. Our use of constant velocity imaging does ignore the Fermat principle.

So how do we construct our depth imaging with constant-velocity imaging. Let us start by looking at two examples of velocity model imaging. Suppose that we construct the virtual events by crosscorrelating the sea-floor reflection with the data from the other reflectors. The results show that we can find the actual velocity, which allows us to properly image the reflector R2. Unfortunately, that is the only reflector which is correctly imaged in this process. However, if we repeat the process by using data constructed by crosscorrelating the response of R2 and the rest of the data, we can again find the actual velocity which allows us to properly image the reflector R3. Therefore, the challenge now is how to construct an automated depth-imaging process based on the idea of a sequential constant velocity imaging of virtual data that can simultaneously produce both the actual velocity model and the depth image of the subsurface. The resulting algorithm is iterative and it uses the concept of bottom image generator (BIG).

By segmenting the data, we cannot image all the reflectors in the data simultaneously. However, an iterative approach can be used to produce a complete model of the subsurface. The basic idea is to continuously move the boundary between $P(x_s, \omega, x)$ and $v_3(x_s, \omega, x_r)$ at each iteration. We will call this boundary the bottom-image generator (BIG).

Some Data-Processing Background Related to Up/Down Separation, P/S Separation, and Velocity-Migration Analysis Deghosting and Up/Down Separation Let us start by recalling the definitions of sources and receiver ghosts. A receiver ghost is an event whose last bounce is at the free surface, whereas a source is an event whose first bounce is at the free surface. In most marine seismic data, source ghosts are generally treated as a component of the source signature because they are very close to the sea surface. Thus they are indistinguishable from events associated with them. The situation is quite different regarding receiver ghosts, especially the OBS (ocean bottom seismic), VC (vertical cable), and walkaway VSP (vertical seismic profile), where the receivers are not close to the sea surface at all. Even for towed-streamer data, the receiver ghosts can be quite significant, especially in bad weather, as one of the current practices for reducing ocean swell noise is to merge streamer quite deep in water.

We can also notice that all receiver ghosts can be classified as downgoing events with respect to the receiver locations. In towed-streamer, OBS, and VC data, the entire downgoing wavefield is made of receiver ghosts only. So the receiver deghosting process, i.e., the process of removing receiver ghosts from data, is equivalent to the up/down separation of these data. However, this equivalence is not true for the walkaway VSP; there are downgoing events which are not receiver ghosts when receivers are located below the sea floor. The fact that this equivalence is not true is the reason why the word deghosting is not generally used in borehole seismic processing, where the objective is to remove the entire downgoing wavefield from the data, including receiver ghosts.

In our imaging algorithm the up/down separation is applied at the BIMG locations at each iteration.

Here are exemplary formulae one can use for performing up/down separation:

$$v_\sigma^{(up)}(k, \omega, x_s) = \frac{1}{2}\{v_\sigma(k, \omega, x_s) + F_{v_3}^{(v_\sigma)}(k, \omega)v_3(k, \omega, x_s)\}, \quad (15)$$

$$v_s^{(up)}(k, \omega, x_s) = \frac{1}{2}\{v_3(k, \omega, x_s) + F_{v_\sigma}^{(v_3)}(k, \omega)v_\sigma(k, \omega, x_s) + F_p^{(v_3)}(k, \omega)p(k, \omega, x_s)\}, \quad (16)$$

$$p^{(up)}(k, \omega, x_s) = \frac{1}{2}\{p(k, \omega, x_s) + F_{v_3}^{(p)}(k, \omega)v_3(k, \omega, x_s)\}, \quad (17)$$

where the filters $$F_{v_3}^{(v_\sigma)}(k, \omega) = -\frac{k_\sigma}{k_{3p}}[1 - 2k_s^{-2}(k_\mu^2 + k_{3p}k_{3s})], \quad (18)$$

-continued $$F_{v_\sigma}^{(v_3)}(k, \omega) = -\frac{k_\sigma}{k_{3s}}[1 - 2k_s^{-2}(k_\mu^2 + k_{3p}k_{3s})], \quad (19)$$

$$F_{v_3}^{(p)}(k, \omega) = \frac{\rho\omega}{k_{3p}}[(1 - 2k_s^{-2}k_\sigma^2)^2 + 4k_s^{-4}k_\sigma^2 k_{3p}k_{3s}]. \quad (20)$$

$$F_{v_3}^{(p)}(k, \omega) = \frac{\rho\omega}{k_{3p}}[(1 - 2k_s^{-2}k_\sigma^2)^2 + 4k_s^{-1}k_\sigma^2 k_{3p}k_{3s}]. \quad (21)$$

with $k=[k_1, k_2]^T$ and $\sigma$ takes the values 1 and 2. $v_j^{(up)}(x, \omega, x_s)$ and $p^{(up)}(k, \omega, x_s)$ represents of upgoing particle velocity and pressure, respectively. The equations are here written and applies in f-k (frequency-wavenumber) domain. Alternative formulae for up/down separation in other domains can also be used.

P/S Splitting

In the third version of our imaging method, we require that data be split into P—(i.e., P-P data) and S-waves (i.e., P-S data). in addition to the application of demultiple.

Let $v_j$ be the particle velocity. We define the P/S splitting, through upgoing P-wave and S-wave potential fields $\phi$ and $\psi_k$, respectively, by applying the divergence and curl operator, respectively, to $v_j$, i.e., $$\phi = -i\omega\rho k_p^{-2}\partial_j v_j; \quad \chi_j = i\omega\rho k_s^{-2}\epsilon_{jkl}\partial_k v_l. \quad (22)$$

Velocity-Migration Analysis

The basic idea for reconstructing the background velocity is to image our data with various velocity models and to select the model which produces focused images of the subsurface. The two basic components of this approach to estimating the background are (i) the tool used for imaging the data and (ii) the criteria for determining the best velocity model. We can, for example, use for the imaging algorithm is a prestack time migration algorithm like Stolt migration. Many constant-velocity migrations are performed, for a number of velocities between $V_{min}$ and $V_{max}$, with a step of $\Delta V$. The criterion for selecting the correct velocity can be the amplitude of migrated results. This criterion essentially amounts to "focusing" the seismic traces so that a large response is obtained. When the traces are properly lined up (i.e., properly moveout corrected), then the sum of traces will be maximized. This idea is similar to the focusing actions of a lens or a parabolic reflector for plane waves.

Algorithmic Steps: Version 1

Step 1: Use the actual data to reconstruct the first reflectors, such as the sea-floor reflection in the case of marine data. We also reconstruct the first velocity model. We use the standard velocity-migration method to reconstruct these image and velocity models of the subsurface.

Step 2: We design the bottom-image generator (BIG) location using the imaging result. The information above the BIG is assumed to be correct, and the remaining model below the BIG is throwaway.

Step 3: We then use a demigration scheme of the image above BIG obtained in Step 2 to also define a bottom-internal-multiple generator (BIMG). The demigration scheme will create only data above the BIMG.

Step 4: Create virtual events using data above and below the BIGM.

Step 5: Remove then internal multiples as described in FIG. 6 for data below the BIGM.

Figure 8:
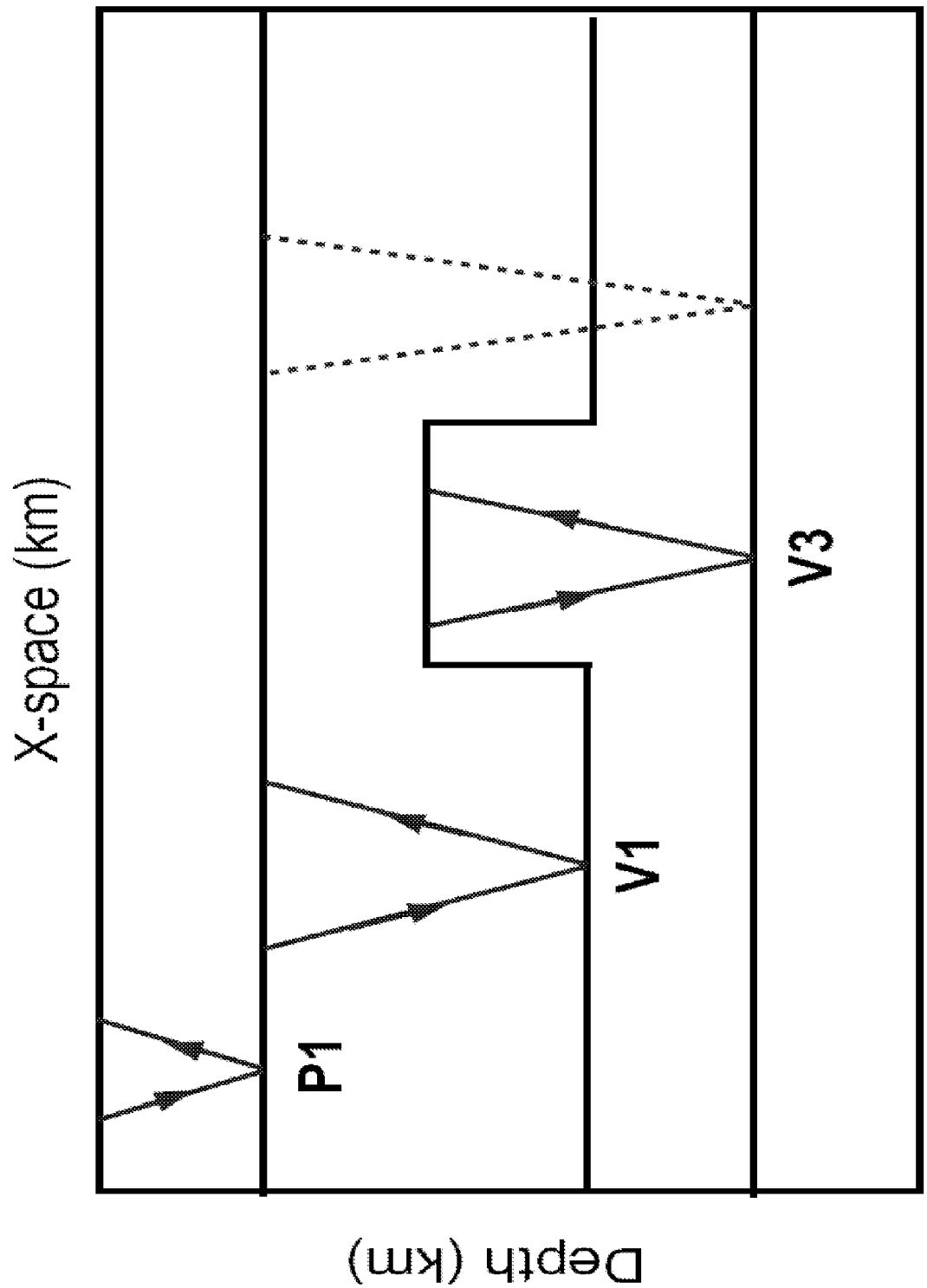
FIG. 8: A description of seismic imaging with a series of events of real and virtual events which can be imaged with constant velocities (P1 is a primary; V1, V2, and V3 are virtual events).

Step 6: Scan the field of virtual events with a velocity-migration; that is, we perform several constant-velocity migrations (e.g., Stolt, 1978) and select the migration result and the corresponding velocity that produce the best-focused image of the subsurface. (See FIG. 8.) We then define a BIG corresponding to the shallowest set of reflectors which are best-focused. We start again from Step 2.

Algorithmic Steps: Version 2

Step 1: Use the actual data to reconstruct the first reflectors, such as the sea-floor reflection in the case of marine data. We also reconstruct the first velocity model. We use the standard velocity-migration method to reconstruct these image and velocity models of the subsurface.

Step 2: We design the bottom-image generator (BIG) location using the imaging result. The information above the BIG is assumed to be correct, and the remaining model below the BIG is a throwaway.

Step 3: We then use a demigration scheme of the image above the BIG obtained in Step 2 to also define a bottom internal multiple generator (BIMG). The demigration scheme will create only data above the BIMG.

Step 4: Create virtual events using data above and below the BIGM.

Step 5: Perform an up/down separation using one of the techniques described in Ikelle and Amundsen (2005).

Step 6: Scan the field of virtual events with a velocity-migration; that is, we perform several constant-velocity migrations (e.g., Stolt, 1978) and select the migration result and the corresponding velocity that produce the best-focused image of the subsurface. (See FIG. 8.) We then define a BIG corresponding to the shallowest set of reflectors which are best-focused. We start again from Step 2.

Algorithmic Steps: Version 3

Step 1: Perform an P/S separation of the data.

Step 2: Use the P-P data to reconstruct the first reflectors such as the sea floor reflection in the case of marine data. We also reconstruct the first velocity model. We use the standard velocity-migration to reconstruct these images and velocity models of the subsurface.

Step 3: Use the P-S data to reconstruct the first reflectors such as the sea floor reflection in the case of marine data. We also reconstruct the first velocity model. We use the standard velocity-migration to reconstruct these image and velocity models of the subsurface.

Step 4: We design the bottom image generator (BIG) location using the imaging result. The information above the BIG is assumed correct and the remaining model below the BIG is throwaway.

Step 5: We then use a demigration scheme of the image above the BIG obtained in Step 4 to also define a bottom internal multiple generator (BIMG). The demigration scheme will create only data above BIMG.

Step 6: Create P-P and P-S virtual events using data above and below the BIGM.

Step 7: Perform an up/down separation using one of the techniques described in Ikelle and Amundsen (2005).

Step 8: Scan the field of P-P virtual events with a velocity-migration; that is, we perform several constant-velocity migrations (e.g., Stolt, 1978) and select the migration result and the corresponding velocity that produce the best-focused image of the subsurface. We then define a BIG corresponding to the shallowest set of reflectors which are best-focused. (See FIG. 8.)

Step 9: Scan the field of P-S virtual events with a velocity-migration that is, we perform several constant-velocity migrations (e.g., Stolt, 1978) and select the migration result and the corresponding velocity that produce the best-focused image of the subsurface. We then define a BIG corresponding to the shallowest set of reflectors which are best-focused. (See FIG. 8.)

We start again from Step 3.

In each case we produce an image, which is in the nature of a concrete result viewable by humans. This image may be printed on paper in one color or in more than one color. It may be displayed on a screen in one color or more than one color.

One skilled in the art may, without undue experimentation, devise myriad obvious improvements and variations upon the invention as set forth herein, all of which are intended to be encompassed within the claims which follow.

The invention claimed is:

1. A method for analyzing seismic data, the method comprising the steps of:

reconstructing first reflectors from the seismic data, yielding an imaging result;

reconstructing a first velocity model;

designing a first bottom-image generator (BIG) location using the imaging result;

defining a bottom-internal-multiple generator (BIMG) location above the first bottom-image generator location;

creating a field of virtual events using seismic data above the bottom-internal-multiple generator location and using seismic data below the bottom-internal-multiple generator location and above the first bottom-image generator location;

removing at least one internal multiple, using the at least one virtual event, for seismic data below the bottom-internal-multiple generator location;

performing a plurality of constant-velocity migration analyses, and selecting a migration result and a corresponding velocity producing a best-focused image of a subsurface.

2. The method of claim 1, further comprising the steps, performed after the selecting step, of:

defining a second bottom-image generator location corresponding to a shallowest set of reflectors which are best-focused; and repeating the defining, creating, removing, performing and selecting steps with respect to the second bottom-image generator location.

3. The method of claim 2, further comprising the steps, performed after the repetition of the selecting step, of:

defining a third bottom-image generator location corresponding to a shallowest set of reflectors which are best-focused; and repeating the defining, creating, removing, performing and selecting steps with respect to the second bottom-image generator location.

4. A method for analyzing seismic data, the method comprising the steps of:

reconstructing first reflectors from the seismic data, yielding an imaging result;

reconstructing a first velocity model;

designing a first bottom-image generator (BIG) location using the imaging result;

defining a bottom-internal-multiple generator (BIMG) location above the first bottom-image generator location;

creating a field of virtual events using seismic data above the bottom-internal-multiple generator location and using seismic data below the bottom-internal-multiple generator location and above the first bottom-image generator location;

performing an up/down separation of the seismic data, using the at least one virtual event;
performing a plurality of constant-velocity migration analyses, and
selecting a migration result and a corresponding velocity producing a best-focused image of a subsurface.

5. The method of claim 4, further comprising the steps, performed after the selecting step, of:
defining a second bottom-image generator location corresponding to a shallowest set of reflectors which are best-focused; and
repeating the defining, creating, removing, performing and selecting steps with respect to the second bottom-image generator location.

6. The method of claim 5, further comprising the steps, performed after the repetition of the selecting step, of:
defining a third bottom-image generator location corresponding to a shallowest set of reflectors which are best-focused; and
repeating the defining, creating, removing, performing and selecting steps with respect to the second bottom-image generator location.

7. A method for analyzing seismic data, the method comprising the steps of:
performing a PIS (compression/shear wave) separation of the seismic data, yielding P-P (compression-compression) data and P-S (compression-shear) data;
reconstructing first reflectors from the P-P data, yielding an imaging result;
reconstructing a first velocity model from the P-P data;
reconstructing first reflectors from the P-S data, yielding a further imaging result;
reconstructing a further first velocity model from the P-S data;
designing a first bottom-image generator (BIG) location using the imaging result;
defining a bottom-internal-multiple generator (BIMG) location above the first bottom-image generator location;
creating a field of P-P virtual events using seismic data above the bottom-internal-multiple generator location and using seismic data below the bottom-internal-multiple generator location and above the first bottom-image generator location;
creating a field of P-S virtual events using seismic data above the bottom-internal-multiple generator location and using seismic data below the bottom-internal-multiple generator location and above the first bottom-image generator location;
performing an up/down separation of the seismic data, using the at least one virtual event;
removing at least one internal multiple, using the at least one virtual event, for seismic data below the bottom-internal-multiple generator location;
performing a plurality of constant-velocity migration analyses with respect to the field of P-P virtual events, and selecting a migration result and a corresponding velocity producing a best-focused image of a subsurface; and
performing a plurality of constant-velocity migration analyses with respect to the field of P-S virtual events, and selecting a migration result and a corresponding velocity producing a best-focused image of a subsurface.

8. The method of claim 7, further comprising the steps, performed after the selecting steps, of:
defining a second bottom-image generator location corresponding to a shallowest set of reflectors which are best-focused; and
repeating the defining, creating, removing, performing and selecting steps with respect to the second bottom-image generator location.

9. The method of claim 8, further comprising the steps, performed after the repetition of the selecting steps, of:
defining a third bottom-image generator location corresponding to a shallowest set of reflectors which are best-focused; and
repeating the defining, creating, removing, performing and selecting steps with respect to the second bottom-image generator location.

10. A method for analyzing seismic data, the method comprising the steps of:
reconstructing first reflectors from the seismic data, yielding an imaging result;
reconstructing a first velocity model;
designing a first bottom-image generator (BIG) location using the imaging result;
defining a bottom-internal-multiple generator (BIMG) location above the first bottom-image generator location;
creating a field of virtual events using seismic data above the bottom-internal-multiple generator location and using seismic data below the bottom-internal-multiple generator location and above the first bottom-image generator location;
removing at least one internal multiple, using the at least one virtual event, for seismic data below the bottom-internal-multiple generator location;
performing a plurality of constant-velocity migration analyses, and
selecting a migration result and a corresponding velocity producing an image of a subsurface.

11. The method of claim 10, further comprising the steps, performed after the selecting step, of:
defining a second bottom-image generator location corresponding to a shallowest set of reflectors; and
repeating the defining, creating, removing, performing and selecting steps with respect to the second bottom-image generator location.

12. The method of claim 11, further comprising the steps, performed after the repetition of the selecting step, of:
defining a third bottom-image generator location corresponding to a shallowest set of reflectors; and
repeating the defining, creating, removing, performing and selecting steps with respect to the second bottom-image generator location.

13. A method for analyzing seismic data, the method comprising the steps of:
reconstructing first reflectors from the seismic data, yielding an imaging result;
reconstructing a first velocity model;
designing a first bottom-image generator (BIG) location using the imaging result;
defining a bottom-internal-multiple generator (BIMG) location above the first bottom-image generator location;
creating a field of virtual events using seismic data above the bottom-internal-multiple generator location and using seismic data below the bottom-internal-multiple generator location and above the first bottom-image generator location;
performing an up/down separation of the seismic data, using the at least one virtual event;

performing a plurality of constant-velocity migration analyses, and selecting a migration result and a corresponding velocity producing an image of a subsurface.

14. The method of claim 13, further comprising the steps, performed after the selecting step, of:

defining a second bottom-image generator location corresponding to a shallowest set of reflectors which; and repeating the defining, creating, removing, performing and selecting steps with respect to the second bottom-image generator location.

15. The method of claim 14, further comprising the steps, performed after the repetition of the selecting step, of:

defining a third bottom-image generator location corresponding to a shallowest set of reflectors which are best-focused; and repeating the defining, creating, removing, performing and selecting steps with respect to the second bottom-image generator location.

16. A method for analyzing seismic data, the method comprising the steps of:

performing a PIS (compression/shear wave) separation of the seismic data, yielding P-P (compression-compression) data and P-S (compression-shear) data;

reconstructing first reflectors from the P-P data, yielding an imaging result;

reconstructing a first velocity model from the P-P data;

reconstructing first reflectors from the P-S data, yielding a further imaging result;

reconstructing a further first velocity model from the P-S data;

designing a first bottom-image generator (BIG) location using the imaging result;

defining a bottom-internal-multiple generator (BIMG) location above the first bottom-image generator location;

creating a field of P-P virtual events using seismic data above the bottom-internal-multiple generator location and using seismic data below the bottom-internal-multiple generator location and above the first bottom-image generator location;

creating a field of P-S virtual events using seismic data above the bottom-internal-multiple generator location and using seismic data below the bottom-internal-multiple generator location and above the first bottom-image generator location;

performing an up/down separation of the seismic data, using the at least one virtual event;

removing at least one internal multiple, using the at least one virtual event, for seismic data below the bottom-internal-multiple generator location;

performing a plurality of constant-velocity migration analyses with respect to the field of p-p virtual events, and selecting a migration result and a corresponding velocity producing an image of a subsurface; and performing a plurality of constant-velocity migration analyses with respect to the field of P-S virtual events, and selecting a migration result and a corresponding velocity producing an image of a subsurface.

17. The method of claim 16, further comprising the steps, performed after the selecting steps, of:

defining a second bottom-image generator location corresponding to a shallowest set of reflectors; and repeating the defining, creating, removing, performing and selecting steps with respect to the second bottom-image generator location.

18. The method of claim 17, further comprising the steps, performed after the repetition of the selecting steps, of:

defining a third bottom-image generator location corresponding to a shallowest set of reflectors; and repeating the defining, creating, removing, performing and selecting steps with respect to the second bottom-image generator location.

* * * * *